United States Patent
Kunze

(10) Patent No.: US 10,542,123 B2
(45) Date of Patent: Jan. 21, 2020

(54) SYSTEM AND METHOD FOR GENERATING AND MONITORING FEEDBACK OF A PUBLISHED WEBPAGE AS IMPLEMENTED ON A REMOTE CLIENT

(71) Applicant: Usabilla, Amsterdam (NE)

(72) Inventor: Gijs Willem Kunze, Amsterdam (NE)

(73) Assignee: USABILLA B.V., Amsterdam (NL)

( * ) Notice: Subject to any disclaimer, the term of this patent is extended or adjusted under 35 U.S.C. 154(b) by 312 days.

(21) Appl. No.: 15/161,678

(22) Filed: May 23, 2016

(65) Prior Publication Data
US 2017/0337168 A1 Nov. 23, 2017

(51) Int. Cl.
*G06F 17/00* (2019.01)
*H04L 29/06* (2006.01)
*H04L 29/08* (2006.01)

(52) U.S. Cl.
CPC .............. *H04L 67/42* (2013.01); *H04L 67/02* (2013.01)

(58) Field of Classification Search
CPC ....... H04L 67/42; H04L 67/02; G06F 17/241; G06F 3/0485; G06F 17/2247; G06F 3/04842; G06F 17/242
USPC ........................................................ 715/230
See application file for complete search history.

(56) References Cited

U.S. PATENT DOCUMENTS

| | | | | |
|---|---|---|---|---|
| 6,230,171 B1* | 5/2001 | Pacifici | ................. | G06F 17/241 707/E17.111 |
| 8,713,438 B1* | 4/2014 | Broniek | ................ | G06F 17/241 715/715 |
| 2005/0289452 A1* | 12/2005 | Kashi | .................. | G06F 17/2247 715/232 |
| 2011/0119571 A1* | 5/2011 | Decker | ............... | G06F 16/9574 715/205 |
| 2012/0324334 A1* | 12/2012 | Leper | ................ | G06F 17/30899 715/234 |
| 2013/0031457 A1* | 1/2013 | Griffiths | ................ | G06F 17/241 715/231 |
| 2015/0032509 A1* | 1/2015 | Fuentes | .............. | G06Q 30/0203 705/7.32 |
| 2015/0286622 A1* | 10/2015 | Majumdar | .............. | H04L 67/02 715/230 |
| 2017/0034244 A1* | 2/2017 | Eschbach | ................ | H04L 67/06 |

* cited by examiner

Primary Examiner — Jason T Edwards
(74) Attorney, Agent, or Firm — Scarinci Hollenbeck, LLC; Libby Babu Varghese

(57) ABSTRACT

A webpage feedback method implemented on a client device comprising the steps of creating a serialized webpage document of the webpage as implemented in the browser on the client device and of the inputted feedback by the feedback script and transmitting the serialized webpage document to the remote server of the serialized annotated webpage document by the implemented feedback script. A webpage feedback method implemented on a server system comprising the steps of receiving a feedback request from a client device on which a subscribing webpage is implemented, uploading a feedback script to the requesting client device, receiving a serialized webpage document from the client device and implementing the web page using the annotated hypertext markup language.

10 Claims, 3 Drawing Sheets

SYSTEM AND METHOD FOR GENERATING AND MONITORING FEEDBACK OF A PUBLISHED WEBPAGE AS IMPLEMENTED ON A REMOTE CLIENT

FIELD OF THE INVENTION

This disclosure relates generally to a system and method for generating and monitoring feedback of a published webpage as it was implemented on a remote client when the feedback was provided.

BACKGROUND

Traditional feedback systems and methods generally limit a user's ability to describe problems and provide suggestions for a website or a web application to entering text within a specified field. Feedback items entered on these traditional feedback systems are reviewed without the aid or insight of any contextual information relevant those feedback items. Rather, feedback items are delivered as static text in an email by means of an automated email ticket. As a result, these traditional feedback systems require the person providing feedback to describe in detail not only what the problem is but also exactly where the problem occurs in the webpage or the web application and how the problem actually affects surrounding components of that webpage or web application. Similarly, a person must describe in detail not only how a suggestion would improve a webpage or a web application but exactly where that suggestion needs to be implemented and how that implementation will actually interact with surrounding components within the webpage or web application. In other words, feedback provided in a text only form requires that the person providing feedback take the time to describe in text only not only a suggested solution to a problem but also the problem itself as well the context in which the problem occurs in order for the feedback to be truly effective. This makes the process of providing truly effective feedback far more cumbersome than just suggesting a solution to a problem found on a webpage or web application.

A person reviewing feedback provided for a webpage or web application using traditional feedback systems and methods will experience limitations similar to those of persons attempting to provide feedback. Specifically, the person reviewing text-only based feedback must first must sift through and interpret text based descriptions of each problem and suggestion and must then attempt to manually reproduce each of those described problems or suggestions within an implementation of the original webpage or web application. More often than not, the person reviewing feedback does not fully understand the problem or the context of a suggestion based on the provided text based solution. As a result, the person reviewing feedback is not able to reproduce exactly what the person providing feedback was seeing or experiencing. Moreover, different text based descriptions of the same or similar problem may not allow a person reviewing feedback to easily link different descriptions from different people to a single common problem. While traditional feedback system may store the universal resource locator address of the webpage for which feedback has been entered, this helps only if the webpage static such that it has not changed since the feedback was entered. Today, the majority of the webpages are dynamic thereby generally precluding the person reviewing the feedback in exactly the same context as the person entering the feedback.

BRIEF SUMMARY

Therefore, the object of this invention is to provide a feedback system that allows a person to review feedback in exactly the same context as was experienced by the person entering the feedback.

A more specific object of the invention is to provide a webpage feedback method implemented on a server system comprising the steps of receiving a feedback request from a client device on which a subscribing webpage is implemented; uploading a feedback script to the requesting client device; receiving a serialized webpage document from the client device; de-serializing and extracting from the received serialized webpage document user inputted feedback and annotated hypertext markup language code of the webpage as implemented on the client device while the user inputted feedback was inputted; identifying annotated portions of the hypertext markup language code within individual elements defined within the extracted annotated hypertext markup language code; loading the extracted annotated hypertext markup language code into a local browser window and manipulating the state of the loaded webpage using the identified annotated portions to replicate the webpage in the local browser as it was implemented in a browser on the client device when user inputted feedback was inputted; generating a plurality of screenshot images of webpage that represent the webpage as a whole as implemented in the local browser; generating a plurality of screenshots of individual elements within the webpage as implemented in the local browser; storing in a database the received serialized webpage document, the extracted annotated hypertext markup language code, the extracted user imputed feedback, and the generated screenshot images; and associating within the database screenshot images of the webpage as a whole and screenshot images of selected individual elements with their respective corresponding user inputted feedback.

In another more specific object of the invention is to provide a webpage feedback method implemented on a client device comprising the steps: transmitting a feedback request to a remote server by a script embedded within a subscribing webpage loaded in a local browser on a client device in response to the selection of a button type element rendered within the loaded subscribing webpage by the embedded script; downloading a feedback script from the remote server and implementing the downloaded feedback script on the client device; prompting a user from within the local browser to select the subscribing webpage as a whole and/or a plurality of specific element from within the subscribing webpage for which feedback is to be provided, the specific elements being those defined within the browser generated document object model of the subscribing webpage, prompting a user from within the local browser to input feedback on the selected subscribing webpage portions; creating a serialized webpage document of the webpage as implemented in the browser on the client device and of the inputted feedback by the feedback script; and transmitting the serialized webpage document to the remote server of the serialized webpage document by the implemented feedback script.

BRIEF DESCRIPTION OF THE DRAWINGS

This disclosure is further described in the detailed description that follows, with reference to the drawings, in which.

DETAILED DESCRIPTION

As discussed above, an exemplary embodiment of a system and method for generating feedback of a published webpage as implemented on a remote client is disclosed. As required, detailed embodiments of the present invention are disclosed herein; however, it is to be understood that the disclosed embodiments are merely exemplary of the invention that may be embodied in various and alternative forms. The figures are not necessarily to scale and some features may be exaggerated or minimized to show details of particular components. Therefore the structural and functional details disclosed herein are not to be interpreted as limiting, but merely as a representative basis for teaching one skilled in the art to variously employ the present invention.

Figure 1:
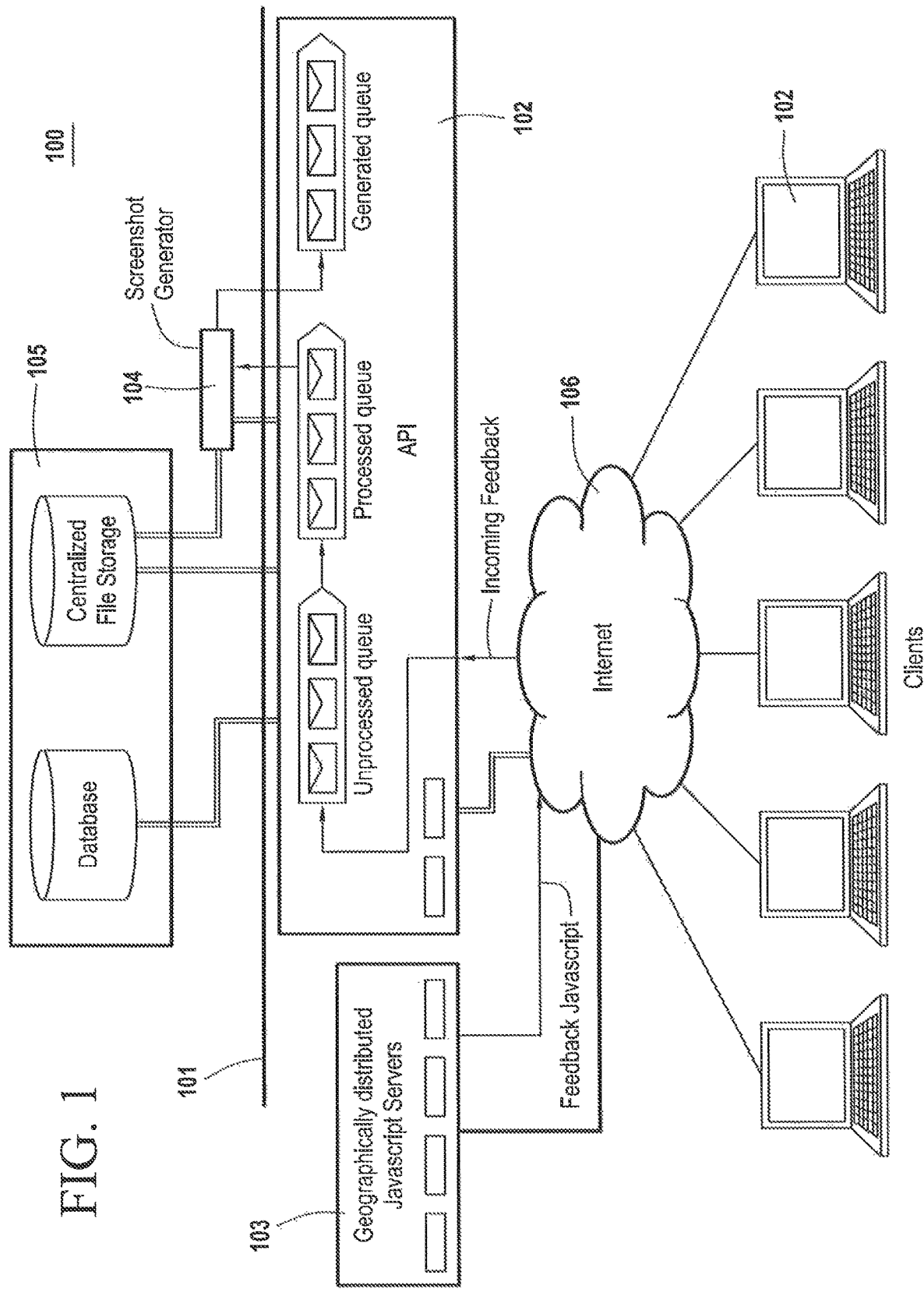
FIG. 1 is a block diagram of a system for generating and monitoring feedback of a published webpage as implemented on a remote client according to an exemplary embodiment of the present invention.

In FIG. 1, a block diagram of a system for generating and monitoring feedback of a published webpage as implemented on a remote client according to an exemplary embodiment of the present invention is shown. As shown in FIG. 1, the exemplary system 100 includes a local area network 101 interconnecting an application program interface ("API") servers 102, JavaScript servers 103, screenshot generator servers 104, and a database 105. The API 102 servers and the JavaScript servers 103 are further connected to the Internet 106 providing remote client devices 107 access to the exemplary infrastructure 100. The Internet 106 also provides the remote client devices 107 access to generic webservers 108 which host webpages that include an embedded script that initiates the feedback process for the current webpage implemented on the remote client device 107 with minimal load on the central processor unit (CPU).

The API servers 102 receive and processes feedback data transmitted from remote client devices 107 and stores received and processed feedback data on the database 105.

The JavaScript servers 103 transmit both a feedback script and a button script to the remote client devices 107 in response to the initiation of the feedback process on a remote client 107 using the script embedded within the webpage, the feedback script and the button script each executed on the remote client device 107 once they are have been downloaded.

The screenshot generator servers 104 generate and then store to the database 105 screenshots of webpages reproduced using annotated HTML code that has been de-serialized by the API server 102, the generated screenshots documenting the current status of the webpage as implemented on the remote client device 107 at the time feedback information was provided. In one exemplary embodiment, the webpage is reproduced using a browser extension implemented on a screenshot generator server 104 using de-serialized annotated HTML code from a remote client device 107. The screenshot generator servers 104 save the full-page screenshots to the database 105 along with other variations of the full-screen version including thumbnails and selected portions of the full-screen version as well as surrounding contextual elements. The screenshot generator servers 104 may also simultaneously generate multiple version of each screenshot with different pixel densities to accommodate high dot-per-inch (DPI) displays including cell phones and tablet like displays.

In an exemplary embodiment, the database 105 is an unstructured document store as opposed to traditional structured column store SQL databases. Each document including meta-data defining at least the association between screenshots and entered feedback.

While the servers are shown and discussed as individual server, it is within the scope of the present invention that the structure may be implemented as a cloud based solution comprised of any number of virtual servers.

Figure 2:
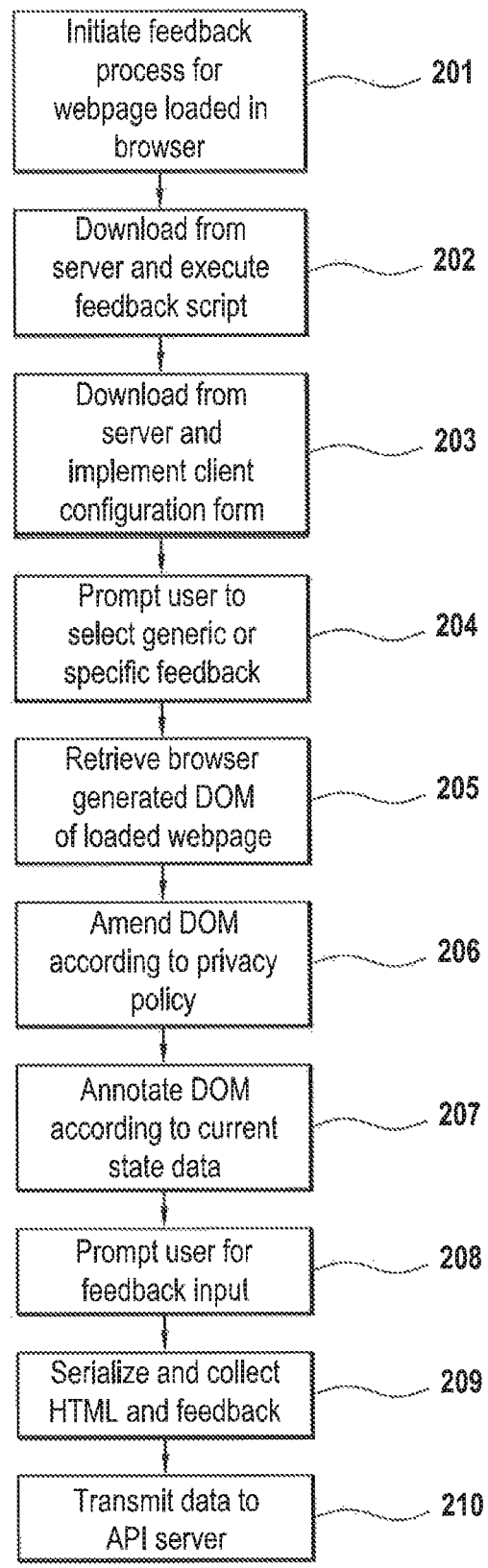
FIG. 2 is a flow chart depicting the remote client process implemented as part of the method for generating and monitoring feedback of a published webpage as implemented on a remote client according to an exemplary embodiment of the present invention.

In FIG. 2, a flow chart depicting a process implemented on remote client devices as an integral part of the method for generating and monitoring feedback of a published webpage as implemented on a remote client device according to an exemplary embodiment of the present invention is shown. As shown in FIG. 2, the process implemented on a remote client device method is initiated in step 201 with the transmission of a feedback request from a client device to a feedback server. In an exemplary embodiment, the transmission request is initiated by the clicking of a feedback button embedded within a published webpage displayed on the remote client device. The feedback button is rendered within the webpage by a button script that is automatically downloaded from the JavaScript servers by the script embedded within that webpage. The embedded script initiates the download of the button script as soon as the webpage is implemented within a browser on the remote client device. The button script is purposely designed to have a minimal effect on the load time of the webpage as well as on the load of the CPU on the remote client device. The feedback process for the implemented webpage is initiated by the clicking of this rendered feedback button.

Once the feedback process has been initiated, the embedded script in step 202 asynchronously downloads a separate feedback script from the JavaScript servers, this feedback script implementing the actual feedback process on the remote client device. The functions performed by the feedback script include rendering a feedback pane within the displayed webpage, allowing a user to select specific elements within the webpage elements for feedback, providing access to an application programing interface ("API") for customized feedback service, attaching custom data to entered feedback, and altering the z-index of certain interface elements within a webpage including the rendered feedback pane. The feedback script may be written in any applicable language know to one of reasonable skill in the art including JavaScript.

Once the feedback script has been downloaded and implemented on the remote client device, the executed feedback script in step 203 downloads a configuration form stored in the database via the feedback server. In an exemplary embodiment, the feedback form is a JavaScript Object Notation ("JSON") document, an open standard format that uses human readable text to transmit data objects consisting of attribute-value pairs. The downloaded feedback form contains customizable attributes that are webpage specific, these attributes including language settings, form value restrictions, user interface settings, privacy settings, form specification settings, theme settings, and feedback initiation settings.

Language settings may include defining a language for displayed feedback forms and whether the defined language reads left-to-right or right-to-left. Form value restrictions may also include defining whether or not values within a form will be included in a subsequently serialized version of the loaded webpage which is transmitted back to the API server along with user inputted feedback.

User interface settings may include definitions of webpage specific custom feedback panes rendered within that webpage.

Privacy settings may include definitions of values or of specific information in the webpage that must be encoded in a subsequently serialized version of the loaded webpage which is transmitted back to the API server along with user inputted feedback.

Form specification restrictions define specific controls that are to be included within in a default feedback form as well as alternate form specifications. Alternate form specifications may be triggered based on which webpage is currently loaded, the IP address of the client device or an API call.

Theme settings may include customization of each feedback user interface based on a specific client of the webpage feedback system.

Feedback initiation settings may include defining a feedback process mode type. The feedback process may begin in different mode types including a specific feedback only mode, a specific or generic mode, a generic feedback only mode or a no screenshot mode.

In the specific feedback only mode, the user will be presented with a small explanatory screen instructing the user to select a specific element within the webpage for which feedback is to be provided. In this mode, a screenshot for the full webpage as well for each selected element within the webpage will be subsequently generated and associated with entered feedback.

In the generic feedback only mode, the user will proceed directly to the serialization of the webpage. In this mode, a screenshot for the full webpage only will be subsequent generated and associated with the entered feedback.

In the specific or generic feedback mode, the user will be presented with a choice of whether to select a specific part of the web page or to proceed directly to the serialization of the webpage.

In the no screenshot mode, the user is immediately presented with a feedback form without having selected any portion of the webpage. In this mode, no screenshots will be generated. This mode may be appropriate in highly regulated industries or in highly secure implementations such that no webpage data is actually transmitted back to the API servers.

Once the configuration form has been downloaded, a feedback mode is selected in step 204 according to the downloaded configuration file, namely either the generic feedback only mode, the specific feedback only mode or the specific or generic feedback mode. If the specific or generic feedback mode is selected, a user on the remote client device is prompted in step 204 to select between generic or specific type of feedback.

Once a feedback mode has been selected, the feedback script in step 205 retrieves the Document Object Model ("DOM") tree of the webpage implemented on the remote client device. The DOM is a platform and language-neutral interface that allows programs and scripts to dynamically access and update the content, structure, and style of a webpage document. The DOM provides a standard object model and programing interface for HTML documents, specifically defining HTML elements as objects and defining the properties, methods to access, and events for all HTML elements. As such, the DOM is a fully object-oriented representation of the webpage that can be modified with a scripting language such as the feedback script. When an HTML, page is rendered in a browser, the browser downloads the HTML into local memory and automatically parses it into a DOM tree and then displays that webpage. Once the webpage has been parsed into its DOM tree, the feedback script accesses the DOM from local memory.

Once the feedback script has accessed the DOM tree of the implemented webpage, the feedback script in step 204 amends the DOM tree according to the privacy policy defined within the downloaded configuration form. Specifically, the feedback creates a copy of the browser generated DOM tree and then redacts this copy according to the defined privacy policy.

A first redaction type is the removal of any value attributes associated with input elements and any textural content associated with text area elements if so defined within the privacy policy.

Subsequent redactions may be defined as client-configured redactions. In an exemplary embodiment, the client-configured redactions are configured as Cascading Style Sheets ("CSS") Selectors whose selectors may include an element redaction set, a text redaction set and an attribute redaction set.

In an element redaction set, any elements within the webpage document that match those selectors defined within the client-configured redactions are completely removed from the copied DOM tree document and replaced with a simple black element with the same dimensions. Any child nodes of those selected elements are also replaced with a simple black box element.

In a text redaction set, any text elements within the webpage that match those selectors defined within the client-configured redactions are replaced with random text generated by the feedback script. The random text will be of a length similar to that of the removed text. The random text is generated using a character frequency table of the English language.

In an attribute redaction set, all HTML attributes within the webpage that match those selectors defined within the client-configured redactions are completely removed from the webpage. This allows for the removal of privacy-sensitive information contained within certain HTML attributes including information with "title", "href", "src", "on" "rel", and "data-*" tags. Attribute redaction is a relatively non-aggressive form of protecting private information that is within a webpage document but generally is not visible when loaded in a browser.

All redactions to the copied DOM tree document are done in the browser on the client device, before any data is transmitted to the feedback server. This makes it possible for the feedback system to be used on websites hosting private information without that information ever leaving the remote client device browser.

Once the copy of the DOM tree document has been redacted according to the privacy policy, the feedback script in step 207 annotates the amended copy of the DOM tree to reflect the current state of the webpage in the browser on the remote client device. Specifically, the feedback script loops through each element defined within the DOM tree and annotates the HTML code for each of those element to add one or more custom attributes which define the current state of those elements and the webpage as a whole in the browser a particular remote client device. The added custom attributes are labelled on the remote client device in a manner that includes a defined and agreed upon keyword recognizable by the applications running on the API and screenshot generator servers. The applications running on the API and screenshot generator servers process the serialized data generated and then transmitted by the feedback scripts on remote client devices. In the examples discussed below, the recognizable keyword is shown as "data-usabilla-*," however any other agreed upon sequence of text may be used.

A discussion and examples of annotated HTML code as envisioned in an exemplary embodiment of the present invention are disclosed below.

The root element within a webpage is the container for all other elements within that webpage and, as such, a webpage document may contain only a single root element. A root element is defined within HTML documents using a pair of "<html>" and </html> tags within which all other elements are defined. The "<html>" tag informs a web browser that a loaded document is actually an HTML document.

The feedback script annotates the root element of a webpage document to include an attribute defining the height and width of both the full webpage document as well as the current viewport of that same webpage. The feedback script further annotates the root element to include an attribute defining the full uniform resource locator ("URL") of the current webpage as well as an attribute defining the character encoding used in the webpage document.

As an example, the root element is annotated to include the custom attribute, "data-usabilla-serialize="' {"window": {"width":1263, "height":699}, "document":{"width":1263, "height":69 28}}'", which defines the height and width of the full document as well as the height and width of the current viewport of the webpage document to be serialized. The root element is further annotated to include the custom attributes "data-usabilla-location=http://demo.usabilla.com/", which defines the full URL of the current webpage and "data-usabilla-charset="UTF-8"", which defines the character encoding used in the HTML document.

Input fields in a webpage specify where in a webpage a user can enter information or data. An input field is defined within HTML documents using a pair of <input> and </input> tags.

The feedback script will annotate the HTML code of input elements to include custom a form sub-object, the form sub-object including properties representative of the input element. Specifically, if the input element is a checkbox or radio type element, the Boolean property "checked" will be added to the included form sub-object to indicate whether or not the checkbox has been checked. If the input element is a text input field type element, a text property "value" will be added to the included form sub-object containing the test data entered into that input field. Additionally, if the text input field is a password type field, every character within that text input field is replaced with an asterisk.

As an example, a text input element is annotated to include the custom attribute "data-usabilla-serializer="{"form":{"value":"Foobar"}}'", which defines the included value property as the text "Foobar" originally entered into that text input field.

As an example, a checkbox element is annotated to include the custom attribute "data-usabilla-serialize="{"form":{"checked":true}}'", which defines the included checked property as true, meaning that the checkbox was checked as the time that feedback was entered.

A canvas element in a webpage is used to include a graphic element within that webpage. A canvas element is defined within HTML documents using a pair of <canvas> and </canvas> elements. The feedback script will annotate canvas elements to include a custom attribute in which is stored a serialized version of the graphics data contained within a canvas container.

As an example, a canvas element is annotated to include the custom attribute "data-usabilla-canvas='data:image/jpeg;base64,<<BASE 64 Encoded Image Inserted Here>>'", in which is store a serialized version of the graphical content within the canvas element.

An iframe element in a webpage is used to embed another document within that webpage. An iframe element is defined within HTML documents using a pair of <frame> and </iframe> tags. The feedback script will initially annotate the iframe element to include a Boolean element whose value defines whether or not the other document defined within the iframe is from the same domain as the loaded webpage.

If it is determined that the other document is from the same domain as the loaded webpage, the feedback script annotates the added Boolean element with a false value. The feedback script then serializes the other document and stores this serialized string into a newly added custom attribute within the iframe element. The serialization of this content involves the same process for annotation and redaction as the one used on the loaded webpage.

If it is determined that the other document is not from the same domain as the loaded webpage, the feedback script annotates the Boolean element with a true value.

As an example, an iframe element is annotated to include the custom attribute "data-usabilla-serialize="{"iframe-cross-site" false}"" which defines that the iframe content is from the same domain as the loaded webpage and to also include the custom attribute "data-iframe="<!DOCTYPE html><html> . . . </html>"", which contains the serialized version of the other document defined within iframe element.

While iterating over each element in the DOM, the feedback script will also check to see if an element is a shadow root. A shadow root is any element that contains within it another DOM tree with its own styling and HTML. If an element is found to be a shadow root, the feedback script will serialize the shadow DOM tree similarly to how an iframe's DOM is serialized and assign the serialized string to an attribute on the element (perhaps data-shadow. Subsequently, the screenshot generator will in turn read out those attributes and recreate the Shadow DOM with the specified contents.

The feedback script also annotates each and every element defined within the DOM tree, including the root element, to include an index attribute that is unique to each element defined within the DOM tree.

As an example, the attribute "element-usabilla-index="<number>"" is added to each element defined within the DOM tree, where "<number>" is a unique for each element defined within that DOM tree.

Lastly, the feedback script annotates select elements within the DOM tree of the webpage to identify them as those elements selected by a user for specific feedback.

As an example, individual element within the DOM tree are annotated to include the custom attribute "data-usabilla-serialize='{"selected":true}" if they have been selected for specific feedback.

Once the amended copy of the DOM tree has been annotated to reflect the current state of the webpage, the feedback script in step 208 prompts the user input feedback. In the exemplary embodiment, the user is prompted using a feedback form. The form may initially present the user with a general question about their overall experience of the webpage. This may then be followed by a set of conditional question presented to the user as a drop down menu. Each conditional question having its own custom set of attached forms that are presented to the user upon selection of a conditional question from the drop down menu.

As an example, the conditional question may query the user as to a specific type of feedback including bug reports, feature request, and compliments. Depending on which option is selected, the user may be prompted with a set of forms containing corresponding follow-up questions. The selected feedback type may be saved as meta-data accompanying the inputted actual feedback.

As will be apparent to one of reasonable skill in the art, the feedback form may include any other means of soliciting and organizing feedback inputted by a user while still remaining within the scope of the present invention.

The feedback form further includes a submit button that the user selects when done inputting feedback information. The selection of this submit button initiates the collection and serialization of all the data to be sent back to the API servers for processing.

Once the user has finished inputting feedback and has selected the submit button, the feedback script in step 209 serializes the annotated copy of the DOM tree of the webpage. Serialization converts structured data, such as the annotated DOM tree, into a sequential representation. The serial representation provides a means of efficiently transferring the webpage document between applications via a network while still preserving the current state of that webpage document. The transferred webpage document is subsequently de-serialized back into the annotated HTML of the original webpage as implemented on the client device. The serial representation of the webpage document also provides for the efficient storage the loaded webpage in a database or similar storage device as a single file.

In the present exemplary embodiment, serialization of the webpage's annotated DOM tree has several additional benefits which enable the features of the present invention. Specifically, webpages for which feedback is to be provided often reside behind a login screen which may prevent the API servers from accessing the same webpage document displayed on the client device and for which feedback was provided. Serialization in the present embodiment enables the capturing of the actual webpage document as implemented in the client device for which feedback was provided.

Also, many webpages include embedded scripts which change the state of the webpage as the user interacts with that webpage. Serialization in the present embodiment enables capturing the current state of the webpage as actually viewed by the user.

Also, dynamic webpages are static pages generated by a server whose content can differ per page load. As a result, successive page loads of the same dynamic webpage may result in successive webpages with different content. Similarly, single page web interfaces are usually JavaScript based pages whose content may change and vary without any page refresh or re-load. Serialization in the present embodiment enables the feedback system to capture that version of the webpage currently loaded on the client device when feedback was provided for that webpage.

Lastly, serialization in the present embodiment allows for the implementation of a privacy policy based redaction of the webpage on the actual client device itself prior to transmission of a serialized webpage document to the API servers. This may help avoid both security and legal issues.

Finally, once the annotated DOM tree has been serialized, all data generated by the feedback script is collected and transmitted to the API server in step 210. The collected data including feedback form data along with any customized data added to that form, the serialized annotated HTML of the webpage as a whole, the serialized annotated HTML of specific webpage elements selected for feedback, client browser information and specific performance data.

Figure 3:
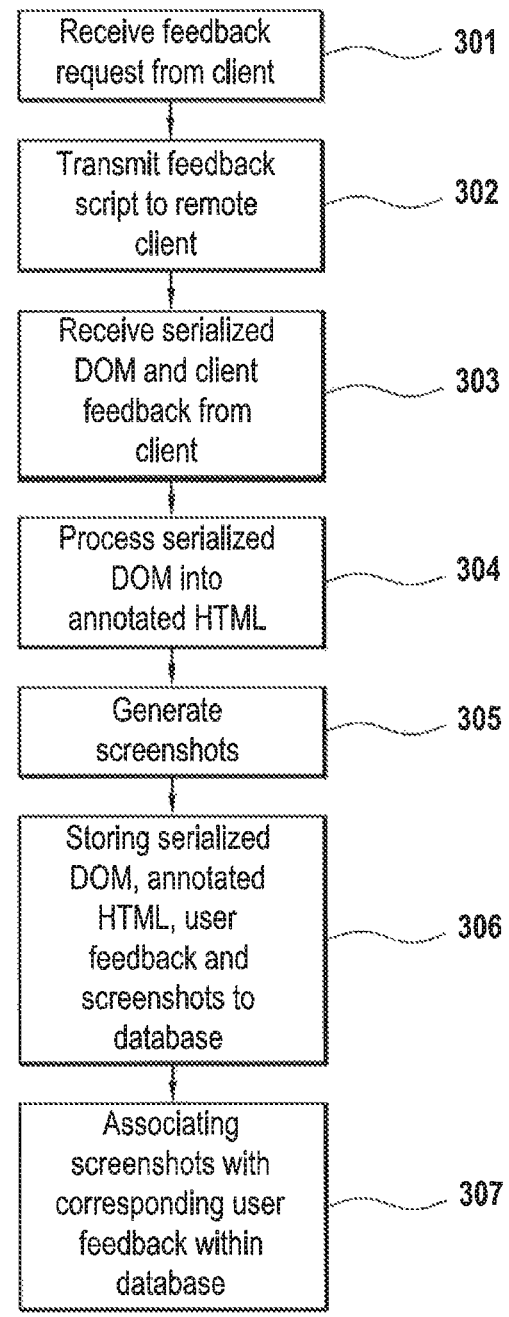
FIG. 3 is a flow chart depicting the server process implemented as part of the method for generating and monitoring feedback of a published webpage as implemented on a remote client according to an exemplary embodiment of the present invention.

In FIG. 3, a flow chart depicting the server process implemented as part of the method for generating and monitoring feedback of a published webpage as implemented on a remote client according to an exemplary embodiment is depicted. As shown in FIG. 3, the server side process is initiated in step 301 with reception of a feedback request from a client device. As discussed above, the feedback request is generated by a script embedded within the displayed webpage.

Once a feedback request has been received from a client device, a JavaScript server in step 302 provides a download of a feedback script to the client device that transmitted the feedback request.

Once the feedback script has been downloaded to the requesting client device, the API server will next receive a serialized webpage document generated and then transmitted by the feedback script in step 303. The received file containing a serialized version of an annotated HTML code of the webpage displayed on the client device while feedback was provided on that client device.

An API server then in step 304 processes the received serialized webpage document and saves the processed webpage document to the database. The processing of the serialized webpage document includes de-serializing the file into a copy of the original annotated HTML code and amending that annotated HTML code if needed. The needed amendments may include adding, if not already present, a "<base href=URL></base>" tag, where "URL" is the URL where the webpage was originally hosted, removing all "<script>" tags, and replacing all "<canvas>" tags with "<img>" tags that contain image data originally stored within the replaced "<canvas>" tag.

Furthermore, any serialized files included as a "data-usabilla-iframe" attribute within "<iframe>" tags is extracted and de-serialized. The de-serialized file is then saved to a local URL location and the "src" attribute within the "<iframe>" tag is amended to point to the new local URL location.

A screenshot of the original webpage is then generated in step 305 by a screenshot generator server. This is done by loading the de-serialized HTML code as processed by an API server into a browser window and modifying the generated webpage in accordance with the annotations included in the de-serialized document.

Specifically, all elements within the webpage are processed using the attributes annotated into the DOM tree. Initially, the browser window in which the web page is loaded is resized to the exact viewport size as it used when the user originally interacted with it on a client device.

Next, if an element within the webpage has a scroll position then that element is scrolled to the same position as when the user interacted with that element on the client device. If an element within the webpage is a checkbox or a radio button, then the element will be checked if they were checked when the user interacted with the webpage on the client device. Text form elements are updated to include the same text they included when the user interacted with those text elements on the client device. If a text element was redacted according to the privacy policy, a special font is assigned that makes the text unreadable within the reproduced webpage.

The webpage is then scrolled in the local browser to the exact same position it was in when feedback was entered. While in this original position within the local browser, the screenshot server identifies any elements which scroll with the viewport of the webpage. Each of the identified elements is then absolutized in its current position thereby avoiding stitching across these elements when screenshots of the webpage viewports are taken of the webpage.

A screenshot server first scrolls the webpage to the top-left border in the browser window and capture that viewport as a screenshot image. The screenshot next scrolls to the top-right border in the browser window and captures that viewpoint as a screenshot image. The screenshot server then scrolls down one page and again captures a top-left screenshot image and then top-right screenshot image. This horizontal and vertical scrolling and capturing of the webpage continues until the total webpage has been captured. The individual viewports screenshots are then stitched to reproduce the complete webpage document.

Specifically, the screenshot server takes the document's width and height and divides them respectively by the viewport's width and height rounding up to get the number of pages it has to generate a screenshot for. It then sequentially generates the screenshot scrolling top to bottom first and left to right second.

The screenshot server then generates several different images of the complete webpage document, namely thumbnails and images of specific elements within that webpage which a user selected for specific feedback. These images are generated with and without surrounding context pixels.

Once all the screenshot images have been generated, the screenshot server in step 306 saves all the generated screenshot images to the database along with the serialized file, the de-serialized processed HTML code and the corresponding feedback provided by a user to the database.

Lastly, the feedback in step 307 is associated in the database to its corresponding webpage as a whole as well as individual webpage element within the webpage.

Feedback for a subscribing webpage may be presented to a client along with a screenshot of the webpage as it was actually implemented on the client device at the time a user inputting their feedback. A user on a remote client may have provided feedback of the webpage as whole as well as providing feedback on selected individual elements within that webpage. The subscribing client may view the provided feedback of the webpage as a whole along with newly generated screenshot images of the webpage as a whole as implemented on the client device when that feedback was inputted. Similarly, the subscribing client may view feedback of selected individual elements within the webpage along with accompanying screenshots of these individual elements as implemented on the client device while feedback was imputed. Moreover, each newly generated screenshot may include surrounding context information in the form of further screenshot images or accompanying meta-data. Moreover, the feedback may be searched within the database based on accompanying meta-data that was either provided by a user on a remote device or gathered by the feedback script running on the client device,

What is claimed is:

1. A webpage feedback method implemented on a server system comprising the steps:

receiving a feedback request from a client device on which a subscribing webpage is implemented;

uploading a feedback script to the requesting client device, wherein the feedback script redacts a first redaction type of the webpage according to a privacy policy;

receiving a serialized webpage document from the client device wherein the serialized webpage document is a copy of the subscribing webpage, said subscribing webpage having been redacted according to the privacy policy defined in a configuration form;

de-serializing and extracting from the received serialized webpage document user inputted feedback and annotated hypertext markup language code of the webpage as implemented on the client device while the user inputted feedback was inputted;

identifying annotated portions of the hypertext markup language code within individual elements defined within the extracted annotated hypertext markup language code;

loading the extracted annotated hypertext markup language code into a local browser window and manipulating the state of the loaded webpage using the identified annotated portions to replicate the webpage in the local browser as it was implemented in a browser on the client device when user inputted feedback was inputted;

generating a plurality of screenshot images of webpage that represent the webpage as a whole as implemented in the local browser;

generating a plurality of screenshots of individual elements within the webpage as implemented in the local browser;

storing in a database the received serialized webpage document, the extracted annotated hypertext markup language code, the extracted user inputted feedback, and the generated screenshot images; and associating within the database screenshot images of the webpage as a whole and screenshot images of selected individual elements with their respective corresponding user inputted feedback.

2. The webpage feedback method implemented on a server system of claim 1, wherein manipulating the state of the loaded webpage includes extracting and applying a character-set attribute, removing script tags, and replacing canvas tags with image tags, each image tag including a data Uniform resource Locator pointing to a location containing image data originally included as attribute data in each replaced canvas tag.

3. The webpage feedback method implemented on a server system of claim 1, wherein loading the annotated hypertext markup language code into a local browser window includes sizing the browser window according to a viewport height and width attribute included in the identified annotated portions of the extracted annotated hypertext markup language code.

4. The webpage feedback method implemented on a server system of claim 1, wherein loading the annotated hypertext markup language code into a local browser window includes positioning any scrollable elements within the webpage according to a scroll-property attribute included in the identified annotated portions of the extracted annotated hypertext markup language code for each scrollable element.

5. The webpage feedback method implemented on a server system of claim 1, wherein loading the annotated hypertext markup language code into a local browser window includes checking or un-checking checkbox and radio button elements within the local browser according to an input-state attribute included in the identified annotated portions of the extracted annotated hypertext markup language code for each of the checkbox and radio button elements.

6. The webpage feedback method implemented on a server system of claim 1, wherein loading the annotated hypertext markup language code into a local browser window further includes filling in text form elements within the local browser according to a form sub-object attribute included in the identified annotated portions of the extracted annotated hypertext markup language code for each of the form elements.

7. The webpage feedback method implemented on a server system of claim 1, wherein loading the annotated hypertext markup language code into a local browser window includes assigning a redaction font to text elements within the local browser according to privacy policy data included in the identified annotated portions of the extracted annotated hypertext markup language code for each of the text elements.

8. The webpage feedback method implemented on a server system of claim 1, wherein generating a plurality of screenshot images of the webpage as a whole includes taking multiple screenshots starting in the upper-left viewport of the browser and ending in the lower-right viewport of the browser and stitching the multiple screenshots together to generate the webpage as a whole in a single image file.

9. The webpage feedback method implemented on a server system of claim 1, the first redaction type removes value attributes associated with input elements and text area elements defined within the privacy policy.

10. The webpage feedback method implemented on a server system of claim 1, the privacy policy is defined in a configuration form downloaded by the feedback script on the client device.

* * * * *